United States Patent [19]

Thompson et al.

[11] 4,306,895
[45] Dec. 22, 1981

[54] COAL STACKING TOWER DUST CONTROL SYSTEM

[75] Inventors: Everett D. Thompson; Dennis D. Sousek, both of Littleton, Colo.

[73] Assignee: Dravo Corporation, Pittsburgh, Pa.

[21] Appl. No.: 117,201

[22] Filed: Jan. 31, 1980

[51] Int. Cl.³ .............................................. B01D 46/02
[52] U.S. Cl. ............................... 55/341 R; 55/385 R; 55/469; 55/97; 193/29
[58] Field of Search .................. 414/133, 41, 42, 291, 414/293, 299; 193/29; 198/560; 55/220, 341 R, 385 R, 469, 97

[56] References Cited

U.S. PATENT DOCUMENTS

| | | | |
|---|---|---|---|
| 483,404 | 9/1892 | Steubner | 193/29 |
| 939,830 | 11/1909 | Haenke et al. | 193/29 |
| 1,779,412 | 10/1930 | Adams | 193/29 |
| 3,881,610 | 5/1975 | Hessling | 55/385 R |
| 3,939,881 | 2/1976 | Scott | 55/385 R |
| 4,061,221 | 12/1977 | Higashinaka et al. | 414/291 |
| 4,169,170 | 9/1979 | Doeksen | 414/133 |

*Primary Examiner*—Bernard Nozick
*Attorney, Agent, or Firm*—Parmelee, Miller, Welsh & Kratz

[57] ABSTRACT

An improved stacking tower is equipped with a dust pollution control system which maintains a negative pressure within the tower and comprises an exhaust means, dust collection and removal means and movable closure means for closing the discharge openings of the tower. A modulating air damper is also provided to adjust the volume of air passing through the tower.

8 Claims, 4 Drawing Figures

COAL STACKING TOWER DUST CONTROL SYSTEM

BACKGROUND OF THE INVENTION

1. Field of the Invention

The invention relates to stacking towers and more particularly to a pollution control system for use with a stacking tower.

2. Prior Art

Many large coal users store their coal in large stockpiles in an open area to achieve maximum accessibility for management of the coal. This storage may be accomplished with the aid of a steel or concrete cylindrical stacking tower having a series of vertically spaced pairs of openings. Each of the openings in a pair are located in opposed sections of the tower wall and the pairs are usually spaced five to six feet vertically. The height of the stacking tower depends on the size of the stockpile desired, with most towers measuring about one hundred feet.

The stacking tower is the most economical system for large tonnage coal storage and therefore most consultants and engineers recommend its use. Unfortunately, the stacking tower is not environmentally clean and some environmental agencies have taken a firm stand against the open stockpiling of coal because of the large volume of fugitive dust generated by the stockpiling operation.

The stacking operation involves the conveyance of the coal to the top of the tower where it drops through the tower to grade level to start the stockpile. The coal flows diametrically through the openings in the tower and is evenly distributed to the pile. This process generates large volumes of dust which emanate through openings in the tower. Additionally, ground winds blow through the openings in the tower and compound the problem.

Some of the fugitive dust will settle out within a few hundred feet of the stacking tower, however, large quantities of airborne particulates will remain suspended. The airborne particulates are the primary pollution factor which is most highly objectional for reasons of health and safety. As a result, standards have been established at various levels of the government designed to control this pollution source and inflict heavy financial penalties for violations.

Present solutions to fugitive dust control for coal stockpiling operations are very limited. The dust control options which are available and recognized by some pollution control agencies are very costly in terms of initial investment and operational expense. Foam injected dust suppressants are but one example. Another positive approach to this problem is to contain the stockpiling operation in an enclosed silo. In both cases the cost is prohibitive.

The present energy crisis has created a renewed interest in and a greater demand for coal. The instant invention will allow the modification of existing stacking towers so that environmental regulations may be followed and the cost of coal storage kept at a reasonable level.

It is therefore an object of this invention to provide a stockpiling tower compatible with pollution laws and regulations that is cost effective.

It is another object of the invention to provide a versatile system which can control the problem of fugitive dust under a variety of ambient conditions during various stages of the stacking operation.

SUMMARY OF THE INVENTION

The invention is directed to an improvement for stacking towers which receive and deposit solid material into a stockpile at the base of the tower. More particularly, the invention provides a pollution control system which collects and filters dust laden air generated during the normal operation of such a stacking tower. The tower itself is defined by an upper loading zone and lower discharge zone. The solid material is delivered into the loading zone and is funneled through a venturi chute for deposit within the discharge zone of the tower. A series of vertically spaced pairs of openings in opposed sections of the walls of the tower are provided for the passage of the solid material from the tower to the stockpile. These openings have closing means consisting of a gravity door and wind deflecting means in the form of a shield.

The pollution control system which is in communication with both zones of the stacking tower includes two baghouses and two exhaust fans. Depending on several different factors, such as ambient wind speed and the level of the stockpile, either one or both of the baghouse and fan subsystems may be used. The pollution control system generates and maintains a negative pressure condition within the tower and an air flow into the baghouses. The volume of air passing through the tower can be controlled by a modulating damper at the upper portion of the discharge zone. The tremendous level of dust generated within the tower during the loading process is captured by this negative pressure air flow and drawn out of the tower into the baghouse. The air laden dust is filtered and discharged while the dust is transported to a dust conditioner for agglomeration and recovery.

DETAILED DESCRIPTION OF THE INVENTION

Figure 1:
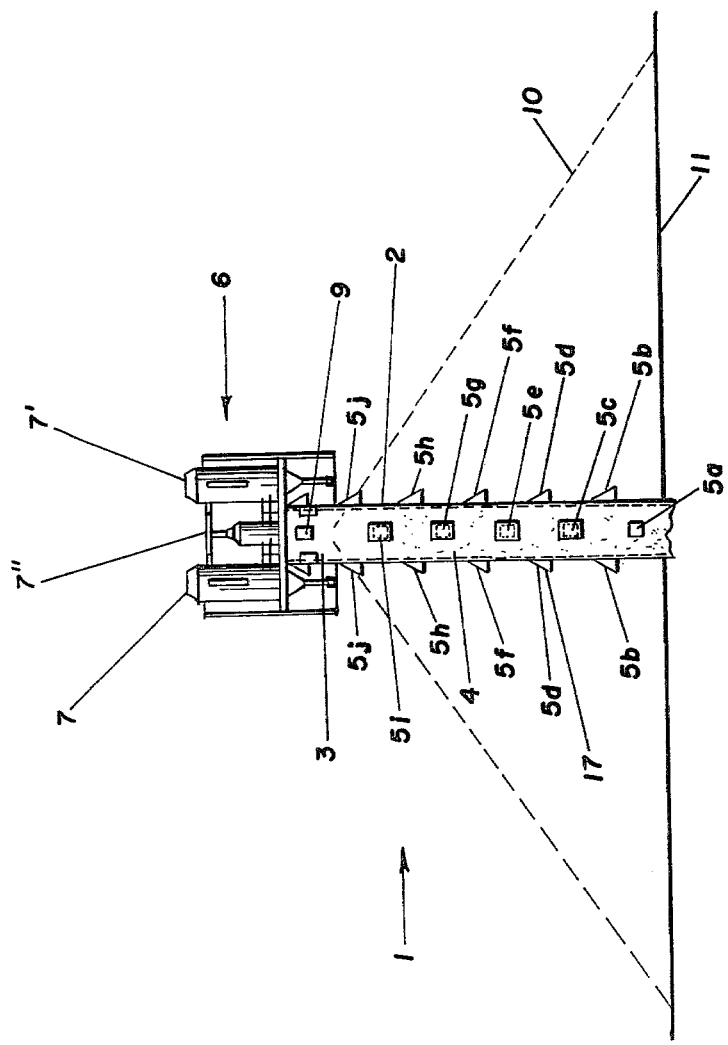
FIG. 1 is an elevational view of a stacking tower incorporating the features of this invention.

In FIG. 1, a stacking tower for recovery and depositing solid material in a stockpile and the pollution control system of the instant invention are generally indicated by the numeral 1. The vertical stacking tower 2 comprises an upper loading zone 3 and a lower discharge zone 4. Included in the discharge zone 4 are a series of vertically spaced pairs of openings 5a thru 5j, each pair being located in opposed sections of the wall of the tower 2. The openings are completely enclosed by a gravity door assembly which will be explained hereinafter. The pollution control system of the instant invention is situated on a platform atop the tower 2 and is generally indicated by the numeral 6. It is preferably comprised of two baghouse dust collection systems 7 and 7' which are in communication with the tower 2 through ductwork 7" therebetween. Two exhaust fans 8

(located behind the baghouses) are used to create a negative pressure within the tower, so that dust liberated in the loading and stacking operations of the tower are drawn from the tower and collected in the baghouses 7 and 7′. While it may be possible to accomplish similar results with a single bag system, the value of a two baghouse system will become obvious in the discussion of FIGS. 3 and 4. In order to maintain a constant volume of air flow through the tower and into the pollution control system, a modulating air damper 9 is located near the top of the discharge zone 4 of the tower 2. The hatched line 10 extending diagonally from the upper section of tower 2 to the grade 11 illustrates the shape and size of a stockpile which can be formed by a stacking tower.

Figure 2:
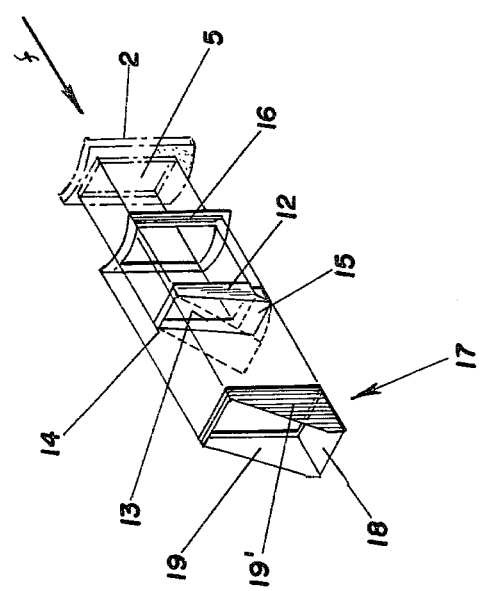
FIG. 2 is an exploded view of a gravity door assembly used in the present invention.

The gravity door assembly illustrated in FIG. 2 consists of a frame 12 with a door 13 attached by a hinge 14 or the like at its top horizontal edge for pivotal movement out away from the frame sill 15. The door assembly also includes a wind deflector mounting plate 16 situated between the wall of the tower 2 and the door frame 12 and a wind deflector hood or shield 17 which may partially surround and extend beyond frame 12. The mounting plate 16 is affixed to tower 2 about an opening 5 and provides means for supporting the frame 12 and shield 17. The wind deflector shield 17 has a rectangular base member 18 which extends from the sill 15 and vertical members 19 and 19′ which extend from the forward edge of each side of base member 18 to the top of the mounting plate 12. The side members are preferably shaped in the form of a right angle triangle as shown.

A door assembly is superimposed over each opening in the discharge zone of the tower 2 and in its rest condition closes an opening to maintain the negative pressure of the pollution control system within the tower. The wind deflector shield 17 prevents ambient air currents, in the open atmosphere in which the stacking is done, from lifting the door out of its rest condition. The door 13 is free to swing out away from the opening 5 whenever a force f is applied to the rearwardly facing surface of the door. The force f is generated by the weight of material within the tower 2 during the coal discharge operation.

Figure 3:
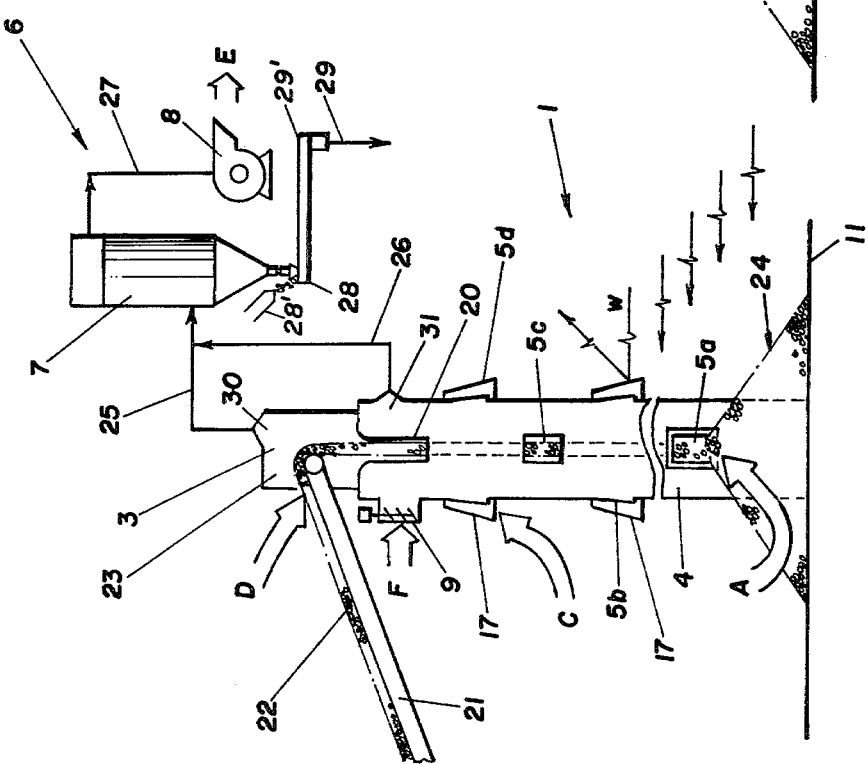
FIG. 3 is a schematic cut-away illustration of the tower and pollution control assembly under maximum air infiltration conditions.

Turning now to FIG. 3, the operation of the pollution control system 6 at the start of a stockpile is illustrated. The vertical stacking tower 2 is divided into an upper loading zone 3 and a lower discharge zone 4 by a venturi chute 20. The upper loading zone 3 includes a charging means such as a conveyor 21 by which solid material such as coal 22 is delivered into the head chute cavity 23. The coal 22 funnels down through the venturi chute 20 into the lower discharge zone 4 which has a series of vertically spaced pairs of openings, openings 5a thru 5d being illustrated. As the discharge zone 4 begins to fill with coal 22, the doors 13 will be forced open and the coal will pour through a pair of openings 5a and start a coal stockpile 24 about the bottom of the tower on grade 11. The size of the stockpile is controlled by the height of the tower and the volume of the coal conveyed thereto. The stockpile will eventually increase in height until the coal 22 can no longer flow through the openings 5a, only one of which is illustrated. At this point, the coal 22 will continue to build up the stockpile 24 until it is level with openings 5b, at which time the entire process is repeated. This cycle will continue until the loading is terminated or the coal stockpile reaches the uppermost openings 5d of the tower.

The use of four pairs of doors is not to suggest the pollution control system is designed for use with only such a configuration or that a greater or lesser number of openings could not be utilized with the invention.

The discharge zone 4 is provided with means to permit the flow of makeup air into the tower as necessary. This means consists of an air damper 9 which can be modulated to adjust the volume of air flowing therethrough. Additionally, the openings 5 in the discharge zone are equipped with the wind deflector hood 17 and door 13 which repel high velocity ground winds and eliminate blow through across the tower.

Figure 4:
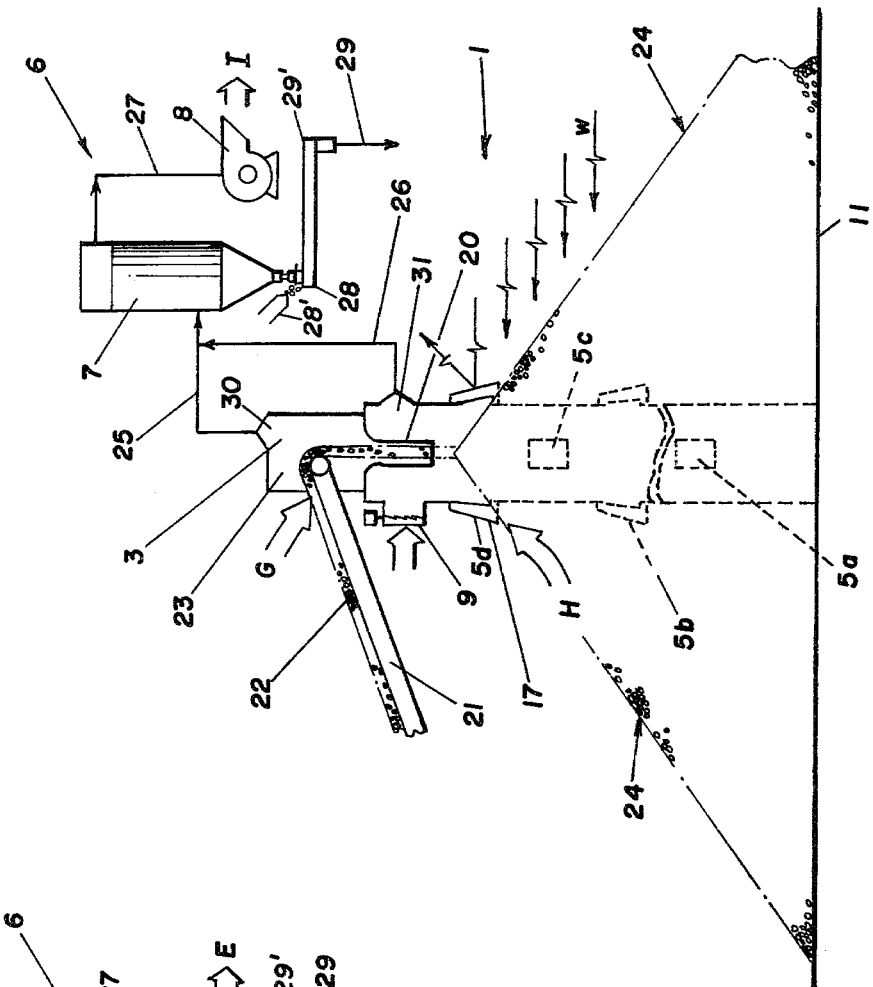
FIG. 4 is a schematic cut-away illustration of the tower and pollution control assembly under minimum air infiltration conditions.

Two operating modes will be described. FIG. 3 illustrates the pollution control system at the beginning of the stacking process when maximum air infiltration is encountered and FIG. 4 illustrates the pollution control system near the termination of stacking operation when minimum air infiltration is encountered with coal in both occurrences fed to the tower at a rate of 1450 tons per hour. The pollution control system, generally indicated by the numeral 6, is a dual system as was previously indicated, however for the sake of clarity only one of the two identical subsystems is illustrated and described.

The pollution control system 6 includes a baghouse 7 in communication with a collecting outlet in the upper region of the loading zone 3 by means of duct 25 and with a collecting outlet in the upper region of the discharge zone 4 by means of duct 26. An exhaust fan 8 is in communication with the baghouse through duct 27. The system 6 also includes a dust conditioner 28 and dust discharge 29.

A variety of components make up the air flow into the tower and include air infiltration through the two open doors through which the coal is being discharged, air infiltration around the closed doors, air entrained by the conveyor, air (950 CFM) being displaced as the volume of coal (1450 tons/hour) within the tower increases, ground winds in the vicinity of the stacking tower, and make up or bleed air for maintaining constant air volume flow through the dust collection system as provided by the damper.

FIG. 3 illustrates a condition of maximum air infiltration at the beginning of the stacking process when both subsystems of the pollution control system are on the line. It is estimated that with a wind velocity W of about 25 MPH near grade level, there would be 10,500 CFM of air infiltration through the open coal doors 5a as shown by the arrow marked A. There would be an additional air infiltration of 2,000 CFM through the remaining doors of the tower as shown by arrow C and 9,100 CFM of air would be entrained through the conveyor 21 at D. Two exhaust fans 8 will be drawing 25,000 CFM of air through the two baghouses 7 and discharging the air at E. The makeup air (2450 CFM) required to balance the system is provided through the modulating damper 9 at F. As the coal 22 is conveyed into the tower, the pollution control system 6 will be generating a negative pressure inside the tower 2 so that air flows from the tower into the baghouses 7. As the coal drops through the venturi chute 20, the air will counterflow upwardly into the pickup areas 30 and 31. Most of the potential airborne dust will be captured in the air flow and drawn out of the tower through ducts 25 and 26 into the baghouses 7. The dust will be filtered from the air and removed to a common dust conditioner 28 which is provided with injecting means 28' by which a liquid suppressant mixes with and agglomerates the dust for disposal. The conditioner may also be provided with means for jettisoning 29' the agglomerated dust modules into the stockpile 24 through discharge 29. As the coal flows diametrically through the open coal doors 13, the wind deflectors 17 over the gravity coal doors break the initial thrust of the wind and act as a hood for dust collection. As a result of this system most of the coal dust will be captured within the tower, thereby minimizing fugitive dust loss.

In FIG. 4, the stockpile of coal is nearly completed with the coal now being discharged through openings 5d. For illustrative purposes, the wind velocity W is now at 2 MPH. The volume of air G being entrained into the loading zone 3 by the conveyor is now at 7,100 CFM and since all but the uppermost pair of doors 5d are sealed by the stockpile, the air infiltration flow H is reduced to about 4,450 CFM. Under such minimum air infiltration conditions, only one fan and baghouse of the dust control system are on the line. The exhaust I from the single fan is about 12,500 CFM so no makeup air is required and the damper 9 is closed. It should also be noted that as the level of the stockpile rises, more air is displaced from the tower by the coal therein. The dust laden air withdrawn from the tower is filtered by a single baghouse and removed to the common conditioner 28 for processing.

During the stockpiling of coal by a stacking tower, a tremendous level of fugitive dust is lost into the atmosphere. The pollution control system herein described draws the potential airborne dust particulate from the tower for processing and disposal in a safe and efficient manner.

We claim:

1. In a stacking tower for receiving and depositing solid material in a stockpile in an open atmosphere subject to wind currents comprising a vertical tower having a series of vertically spaced pairs of openings, each of said openings of a pair being in opposed sections of the wall of the tower, a charging means for charging solid material into the upper region of the tower for flow downwardly therethrough and out of a pair of said openings when the level of solid material reaches said pair of openings, and movable closure means for closing each of said openings when solid material is not flowing therethrough, the improvement comprising:

inlet means for providing air into the upper region of said tower;

damper means to regulate the volume of air passing through said inlet means;

exhaust means for exhausting dust laden air from the upper region of said tower; said exhaust means providing a negative pressure within said tower during charging of solid material therethrough, said exhaust means cooperating with said damper means to maintain the aforementioned pressure within the tower as the tower fills with coal and the volume of air within the tower decreases; and dust collecting means for removing dust from said exhausted dust laden air.

2. A stacking tower as defined in claim 1 wherein the exhaust means for maintaining said tower in a negative pressure condition are situated at the top of said tower.

3. A stacking tower according to claim 1 wherein the exhaust means and the collecting means consist of first and second fans and baghouses in communication with the tower and operable to establish and maintain the negative pressure within the tower under varying conditions so that as the stacking operation is initiated and the tower contains a low level of coal and a high volume of air therein both said first and second fans and baghouses are to be employed whereas when the stacking operation nears completion and the tower is nearly filed with coal and has a low volume of air therein, only one of said fans and baghouses is used to maintain the negative pressure within the tower.

4. A stacking tower as defined in claim 1 including shielding means positioned on the outer wall of said tower about said openings to reduce influx of wind currents of said open atmosphere into said tower.

5. A stacking tower as defined in claim 4 wherein said tower includes a venturi chute in the upper region thereof separating said tower into an upper loading zone and a lower discharge zone and wherein said exhaust means exhausts dust laden air from both said zones.

6. A stacking tower as defined in claim 5 wherein the exhaust means includes at least one exhaust fan in communication with said tower at both said upper loading zone and lower discharge zone for maintaining a negative pressure within said tower.

7. A stacking tower as defined in claim 6 wherein the means for removing dust from said exhaust laden air includes means for injecting a liquid suppressant into said dust so as to agglomerate said dust.

8. A stacking tower as defined in claim 7 including means for jettisoning the agglomerated dust from the collecting means.

* * * * *